United States Patent
Davis

(10) Patent No.: US 12,276,734 B1
(45) Date of Patent: Apr. 15, 2025

(54) ENCRYPTED LIDAR SYSTEMS AND METHODS

(71) Applicant: Amazon Technologies, Inc., Seattle, WA (US)

(72) Inventor: Michael T. Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1015 days.

(21) Appl. No.: 17/113,427

(22) Filed: Dec. 7, 2020

(51) Int. Cl.
  *G01S 17/933* (2020.01)
  *G01S 7/484* (2006.01)
  *G01S 7/486* (2020.01)

(52) U.S. Cl.
  CPC ............ *G01S 17/933* (2013.01); *G01S 7/484* (2013.01); *G01S 7/486* (2013.01)

(58) Field of Classification Search
  CPC ........ G01S 7/484; G01S 7/486; G01S 7/4861; G01S 7/4866; G01S 7/487; G01S 7/4876; G01S 7/499; G01S 17/08; G01S 17/10; G01S 17/26; G01S 17/36; G01S 17/933
  See application file for complete search history.

(56) References Cited

U.S. PATENT DOCUMENTS

| | | | | |
|---|---|---|---|---|
| 2016/0327646 | A1* | 11/2016 | Scheim | G01S 17/26 |
| 2017/0329010 | A1* | 11/2017 | Warke | G01S 17/10 |
| 2018/0203099 | A1* | 7/2018 | Kiehn | G01S 17/931 |
| 2018/0284279 | A1* | 10/2018 | Campbell | G01S 7/4861 |
| 2019/0227175 | A1* | 7/2019 | Steinberg | G01S 7/4817 |
| 2019/0265359 | A1* | 8/2019 | Datta | G01S 7/4814 |
| 2019/0285749 | A1* | 9/2019 | Chen | G01S 7/487 |
| 2019/0353787 | A1* | 11/2019 | Petit | G01S 7/484 |
| 2020/0278430 | A1* | 9/2020 | Zhu | G01S 7/487 |
| 2020/0336303 | A1* | 10/2020 | Sierra | H04L 63/1475 |

(Continued)

OTHER PUBLICATIONS

Q. Wang, Y. Zhang, Y. Xu, L. Hao, Z. Zhang, T. Qiao, Y. Zhao, "Pseudorandom modulation quantum secured lidar", 2015, Optik, vol. 126, Issue 22, 3344-3348 (Year: 2015).*

(Continued)

*Primary Examiner* — Yuqing Xiao
*Assistant Examiner* — Benjamin Richard Hebert
(74) *Attorney, Agent, or Firm* — Athorus, PLLC

(57) ABSTRACT

Described are systems and methods for providing an encrypted LIDAR system, which may be used in autonomous vehicles. Embodiments of the present disclosure can provide LIDAR systems and methods employing a cryptographically secure deterministic random bit generator (DRBG) to generate a secure pseudorandom key sequence. The secure pseudorandom key sequence can be encoded into light pulses emitted by the exemplary systems and methods. Subsequently, upon receipt of reflected light, the exemplary systems and methods can authenticate the received reflected light to confirm the key sequence encoded in the received reflected light. If the key sequence encoded in the received reflected light matches the key sequence encoded into the emitted light pulse, parameters associated with the emitted and reflected light can be used to determine a distance to the object that may have reflected the emitted light pulse. In the event the received reflected light does not include the encoded key sequence the received light can be "discarded" by the exemplary systems and methods.

15 Claims, 8 Drawing Sheets

(56) References Cited

U.S. PATENT DOCUMENTS

2021/0063547 A1\* 3/2021 Middelberg ........... A01B 71/08
2021/0096219 A1\* 4/2021 Cox ........................ G01S 17/89
2021/0405155 A1\* 12/2021 Shand ..................... G01S 17/42

OTHER PUBLICATIONS

"Deterministic Random Bit Generator (DRBG)—Glossary", Accessed via The Wayback Machine to the date Aug. 10, 2020, National Institute of Standards and Technology, pp. 1-3 (Year: 2020).\*

\* cited by examiner

| BIT SEQUENCE | 0 | 0 | 1 | 0 | 1 | 1 | 1 |
|---|---|---|---|---|---|---|---|
| BASIS OF POLARIZATION | + | × | × | + | + | + | × |
| POLARIZATION STATE | ← | ↙ | ↗ | ← | ↑ | ↑ | ↗ |

FIG. 4C

ENCRYPTED LIDAR SYSTEMS AND METHODS

BACKGROUND

Autonomous vehicles, such as unmanned ground vehicles, unmanned aerial vehicles, unmanned water-based vehicles, etc. are being increasingly utilized in a wide range of implementations. For example, autonomous vehicles are being utilized to deliver packages, food, and other items, perform surveys, monitor traffic, provide security or surveillance, and perform other tasks and missions. Further, passenger transportation in vehicles such as cars, trucks, buses, and the like is increasingly striving for more autonomous operation. To facilitate autonomous operation of autonomous vehicles through an environment, many autonomous vehicles rely on a variety of sensors, such as light detection and ranging ("LIDAR") to detect objects and measure distances to detected objects. However, although LIDAR can be highly effective, traditional LIDAR systems do not employ encryption schemes, making them vulnerable to interference from other LIDAR systems and other sources and/or reflections of light, and potentially malicious spoofing attempts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4C is a table illustrating an exemplary encoding protocol, according to exemplary embodiments of the present disclosure.

Figure 1:
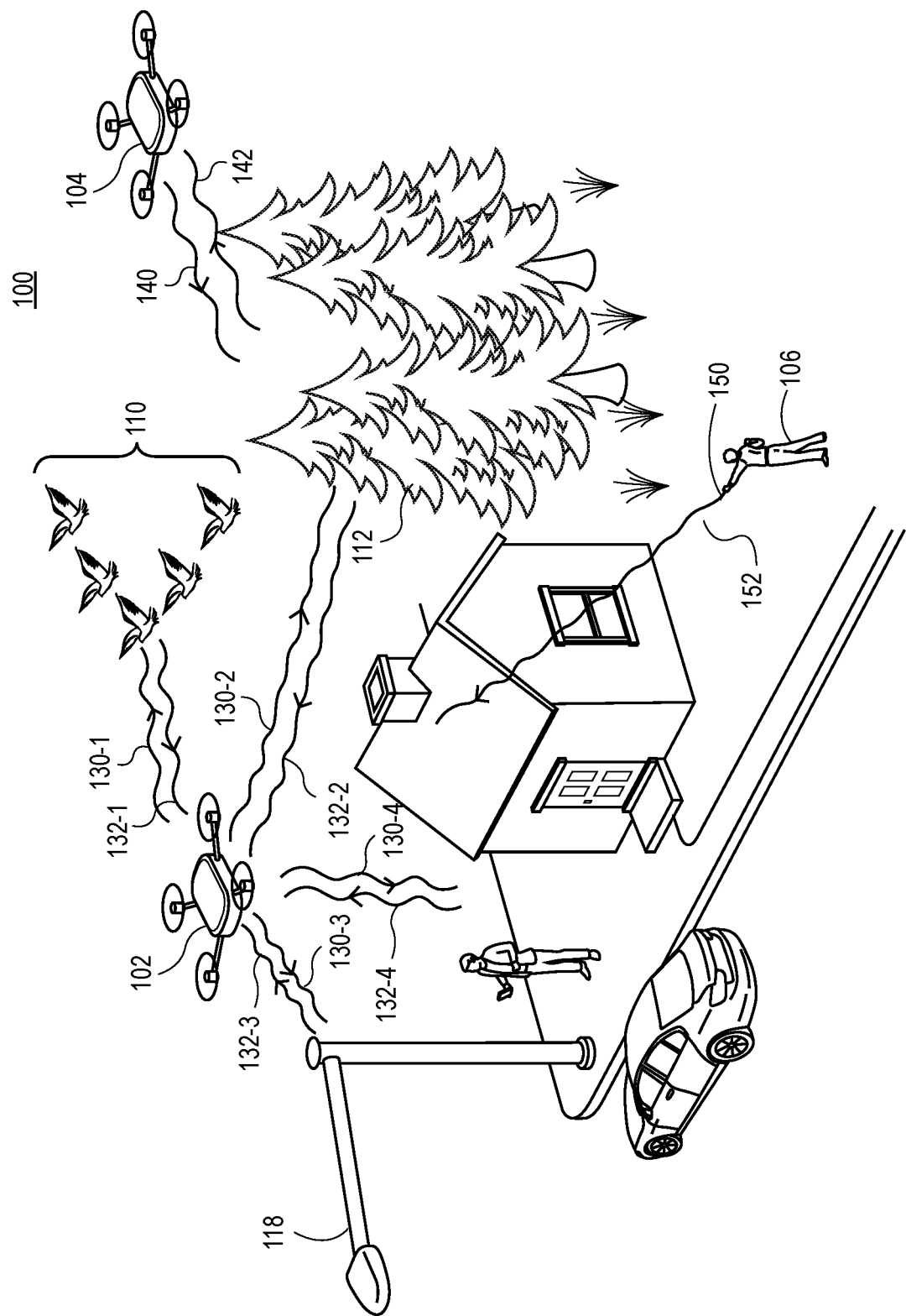
FIG. 1 is an illustration of an exemplary environment in which an autonomous aerial vehicle may operate, in accordance with exemplary embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As is set forth in greater detail below, embodiments of the present disclosure are generally directed to encrypted LIDAR systems and methods, which may be used in autonomous vehicles, such as unmanned aerial vehicles (UAVs), autonomous ground vehicles (AGVs), and the like. Specifically, exemplary embodiments of the present disclosure can provide LIDAR systems and methods employing a cryptographically secure deterministic random bit generator (DRBG) to generate a secure pseudorandom key sequence. The secure pseudorandom key sequence can then be encoded into the emitted light pulses to provide secure encryption for the LIDAR system. Accordingly, secure encryption can mitigate certain vulnerabilities to which conventional LIDAR systems may be susceptible, such as interference from other source and intentional malicious spoofing attempts.

LIDAR systems typically employ an emitter or light source, such as a laser, and a sensor. The light source may be configured to emit a light pulse, and the sensor may be configured to receive the light reflected by objects on which the emitted light pulse was incident. Certain parameters associated with the emitted light and received reflected light, such as time-of-flight, intensity, attenuation, or other parameters of the emitted and reflected light can then be used to determine a distance to the object. The exemplary LIDAR system according to exemplary embodiments of the present disclosure further utilizes an emitted light pulse encoded with a secure pseudorandom key sequence to mitigate possible sources of interference and/or malicious attacks.

Specifically, the exemplary LIDAR can employ a cryptographically secure deterministic random bit generator (DRBG) to generate a secure pseudorandom key sequence that can be encoded in the emitted light pulses. For example, the secure pseudorandom key sequence can be encoded in the polarization and/or the frequency of the emitted light pulses. Specifically, the polarization states and/or the frequency of the emitted light pulses can be assigned values to encode the secure pseudorandom key sequence in the emitted light pulses. Accordingly, the exemplary LIDAR system may emit the encoded light pulses, and, upon receipt of reflected light, the exemplary LIDAR system can authenticate the received reflected light to confirm the key sequence encoded in the received reflected light. If the key sequence encoded in the received reflected light matches the key sequence encoded into the emitted light pulse, parameters associated with the emitted and reflected light (e.g., time-of-flight, intensity, attenuation, etc.) can be used to determine a distance to the object that may have reflected the emitted light pulse. In the event the received reflected light does not include the encoded key sequence (e.g., no key sequence is encoded in the light, the encoded sequence does not match the key sequence encoded in the emitted light pulse, etc.) the received light can be "discarded" by the exemplary LIDAR system such that the "discarded" light is not used in the determination of a distance to an object. Optionally, the exemplary LIDAR systems can monitor the instances of the "discarded" light as real-time feedback (e.g., ratio of authenticated reflected light compared to unauthentic reflected light, etc.) of interfering and/or malicious light as an indication of the optical conditions in the environment. Further, the character of the discarded light (e.g., certain parameters associated with the reflected light such as the nature of the encoded bit stream, any associated delay, etc.) may also provide an indication whether someone or something in the environment may be attempting to intentionally manipulate and/or interfere with the light being emitted and/or received by the exemplary LIDAR system.

Further, although embodiments of the present disclosure are described primarily with respect to autonomous aerial vehicles, embodiments of the present disclosure can be applicable to any sensing system relying on time-of-flight measurements, and/or other types of autonomous vehicles. For example, embodiments of the present disclosure can be applicable to any LIDAR systems and any systems employing LIDAR or other time-of-flight measurement systems, such as unmanned aerial vehicles, ground-based vehicles, autonomous ground-based vehicles, water-based vehicles, unmanned water-based vehicles, robotic safety systems, and the like.

FIG. 1 shows an exemplary environment 100 in which one or more autonomous vehicles may operate, according to exemplary embodiments of the present disclosure.

As shown in FIG. 1, aerial vehicle 102 may be operating and/or navigating in environment 100. To facilitate autonomous operation and/or navigation, aerial vehicle 102 may rely on various sensors and navigational systems. One such sensing system that may be employed by aerial vehicle 102 is LIDAR. The LIDAR system associated with aerial vehicle 102 may operate in conjunction with other sensing and navigational systems, such as imaging devices, an inertial measurement unit, accelerometers, gyroscopes, navigational sensors, global positioning system (GPS), thermal sensors, infrared sensors, pressure sensors, or other sensors and systems that may facilitate autonomous operation and/or navigation of aerial vehicle 102.

As shown in FIG. 1, as aerial vehicle 102 is operating and/or navigating in environment 100, the LIDAR system associated with aerial vehicle 102 may facilitate the detection of objects, surfaces (e.g., the ground, a landing platform, etc.), etc. and the measurement of distances to the detected objects and surfaces. For example, the LIDAR system associated with aerial vehicle 102 may emit light pulses 130 to detect objects and surfaces and measure the distances to the detected objects and surfaces in environment 100. Emitted light pulses 130 may be reflected by various objects and surfaces in environment 100, and the LIDAR system associated with aerial vehicle 102 may receive reflected light pulses 132. Upon receipt of reflected light pulses 132, the LIDAR system associated with aerial vehicle 102 is then able to calculate a distance to each of the detected objects based on parameters associated with emitted light pulses 130 and reflected light pulses 132 (e.g., a time-of-flight, intensity, attenuation, etc.). Based on the data and/or information that can be obtained by the LIDAR system based on emitted light pulses 130 and reflected light pulses 132, a rendering of environment 100 (e.g., a three-dimensional point cloud, an elevational model, range-finding to surfaces, altitude measurements, other mesh model, etc.) can be created. The rendering of environment 100 can be utilized by aerial vehicle 102 to facilitate autonomous operation and/or navigation of aerial vehicle 102 (e.g., object detection and avoidance, detection of landmarks, object tracking, etc.) in environment 100. Additionally, the data and/or information obtained from emitted light pulses 130 and reflected light pulses 132 can provide an accurate measurement of altitude and/or distance to the ground, the top of buildings and other structures, a landing platform, etc.

In the implementation shown in FIG. 1, the LIDAR system associated with aerial vehicle 102 may emit light pulses 130-1, 130-2, 130-3, and/or 130-4. As shown in FIG. 1, emitted light pulse 130-1 may illuminate birds 110, emitted light pulse 130-2 may illuminate trees 112, emitted light pulse 130-3 may illuminate streetlamp 118, and emitted light pulse 130-4 may illuminate the ground or other surface. Accordingly, emitted light pulses 130-1, 130-2, 130-3, and/or 130-4 may reflect off certain points on various surfaces of each of the respective illuminated objects, and the LIDAR system associated with aerial vehicle 102 may receive the reflected light. For example, the LIDAR system may receive reflected light 132-1 (e.g., which may include light from the reflection of emitted light pulse 130-1 by birds 110), reflected light 132-2 (e.g., which may include light from the reflection of emitted light pulse 130-2 by trees 112), reflected light 132-3 (e.g., which may include light from the reflection of emitted light pulse 130-3 by streetlamp 118), and/or reflected light 132-4 (e.g., which may include light from the reflection of emitted light pulse 130-4 by the ground or other surfaces). The LIDAR system associated with aerial vehicle 102 may then be able to determine the distance from aerial vehicle 102 to objects based on parameters, such as time of flight and intensity, associated with the emitted and reflected light. This information can be used to generate a rendering of the environment (e.g., a three-dimensional point cloud, an elevational model, range-finding to surfaces, altitude measurements, other mesh model, etc.), which can facilitate operation and/or navigation of aerial vehicle 102. Additionally, the parameters obtained from emitted light pulses 130 and reflected light pulses 132 can provide an accurate measurement of altitude and/or distance to surfaces, such as the ground, the top of buildings and other structures, a landing platform, etc.

Also as shown in FIG. 1, environment 100 may include potential sources of interference to traditional LIDAR systems. For example, potential sources of interference to traditional LIDAR systems may include a LIDAR system associated with aerial vehicle 104 and malicious actor 106. The LIDAR system associated with aerial vehicle 104 and malicious actor 106 are merely two exemplary potential sources of interference for traditional LIDAR systems. Aspects of the present disclosure contemplate that any source of optical energy generating, transmitting, reflecting, emitting, or otherwise sourcing an optical signal having a wavelength similar to the light pulses utilized by a traditional LIDAR system may be a potential source of interference.

For example, during operation and/or navigation of aerial vehicle 104, the LIDAR system associated with aerial vehicle 104 may emit light pulse 140, which may have a wavelength similar to emitted light pulses 130-1, 130-2, 130-3, and/or 130-4. Consequently, in the event that the LIDAR system associated with aerial vehicle 102 were a traditional LIDAR system and receives emitted light pulse 140 (and/or reflected light 142), the LIDAR system associated with aerial vehicle 102 may mistakenly perceive emitted light pulse 140 (and/or reflected light 142) to be the reflection of emitted light pulses 130-1, 130-2, 130-3, and/or 130-4 (e.g., reflected light 132-1, 132-2, 132-3, and/or 132-4). Accordingly, based on the mistaken perception of emitted light pulse 140 (and/or reflected light 142), the LIDAR system associated with aerial vehicle 102 may "detect" perceive phantom objects, determine improper distances to existing objects, or make other incorrect determinations based on the interference of emitted light pulse 140 (and/or reflected light 142).

The LIDAR system associated with aerial vehicle 102, if it were a traditional LIDAR system, may respond similarly to actions taken by malicious actor 106. As shown in FIG. 1, malicious actor 106 may aim optical energy source 150 emitting optical energy 152 at aerial vehicle 102. Similarly, in the event that emitted optical energy 152 has a wavelength similar to emitted light pulses 130-1, 130-2, 130-3, and/or 130-4, and the LIDAR system associated with aerial vehicle 102 were a traditional LIDAR system and receives emitted optical energy 152, the LIDAR system associated with aerial vehicle 102 may mistakenly perceive emitted optical energy 152 to be the reflection of emitted light pulses 130-1, 130-2, 130-3, and/or 130-4 (e.g., reflected light 132-1, 132-2, 132-3, and/or 132-4). Accordingly, based on the mistaken perception of emitted optical energy 152, the LIDAR system associated with aerial vehicle 102 may "detect" perceive phantom objects, determine improper distances to existing objects, or make other incorrect determinations based on the interference of emitted optical energy 152.

Rather than employing a traditional LIDAR system, according to exemplary embodiments of the present disclosure, aerial vehicle 102 can include a LIDAR system configured to employ encoded light pulses. For example, the exemplary LIDAR system according to embodiments of the present disclosure can include a cryptographically secure deterministic random bit generator to generate a secure pseudorandom key sequence that can be encoded in emitted light pulses 130-1, 130-2, 130-3, and/or 130-4. For example, the secure pseudorandom key sequence can be encoded in the polarization and/or the frequency of emitted light pulses 130-1, 130-2, 130-3, and/or 130-4. Specifically, the polarization states and/or the frequency of the emitted light pulses can be assigned values to encode the secure pseudorandom key sequence encoded in emitted light pulses 130-1, 130-2, 130-3, and/or 130-4. Accordingly, the exemplary LIDAR system may emit emitted light pulses 130-1, 130-2, 130-3, and/or 130-4 encoded with the secure pseudorandom key sequence, and, upon receipt of any light, the exemplary LIDAR system associated with aerial vehicle 102 can authenticate the received light to confirm whether the received light is encoded with the same key sequence.

For example, if the LIDAR system were to receive reflected light 132-1, 132-2, 132-2, and/or 132-4, which may include light from the reflection of emitted light pulses 130-1, 130-2, 130-3, and/or 130-4, respectively, the exemplary LIDAR system can authenticate the received light to confirm that the received reflected light includes the correct key sequence, and can therefore process the received reflected light 132-1, 132-2, 132-3, and/or 132-4 to determine distance(s) to the object(s) and/or surface that may have reflected emitted light pulses 130-1, 130-2, 130-3, and/or 130-4. In the event the received light does not include the encoded key sequence and is therefore unauthenticated (e.g., the received light does not include an encoded key sequence, the received light includes an encoded sequence that does not match the key sequence encoded in the emitted light pulse, etc.), the received light can be "discarded" by the exemplary LIDAR system such that the "discarded" light is not used in the determination of a distance to any object. For example, in the event that emitted light pulse 140 and/or emitted optical energy 152 were received by the exemplary LIDAR system associated with aerial vehicle 102, emitted light pulse 140 and/or emitted optical energy 152 may be discarded by the exemplary LIDAR system associated with aerial vehicle 102 such that emitted light pulse 140 and/or emitted optical energy 152 are not used in the determination of a distance to any object and/or in the generation of a rendering of the environment (e.g., a three-dimensional point cloud, an elevational model, range-finding to surfaces, altitude measurements, other mesh model, etc.). Further, certain statistical parameters associated with the amount of "discarded" light (e.g., ratio of authenticated reflected light compared to unauthentic reflected light, etc.) can be maintained and analyzed as real-time feedback indicating the amount of interfering and/or malicious light in the environment. Further, the character of the discarded light (e.g., certain parameters associated with the reflected light such as the nature of the encoded bit stream, any associated delay, etc.) may also provide an indication whether someone or something in the environment may be attempting to intentionally manipulate and/or interfere with the light being emitted and/or received by the exemplary LIDAR system.

Figure 2:
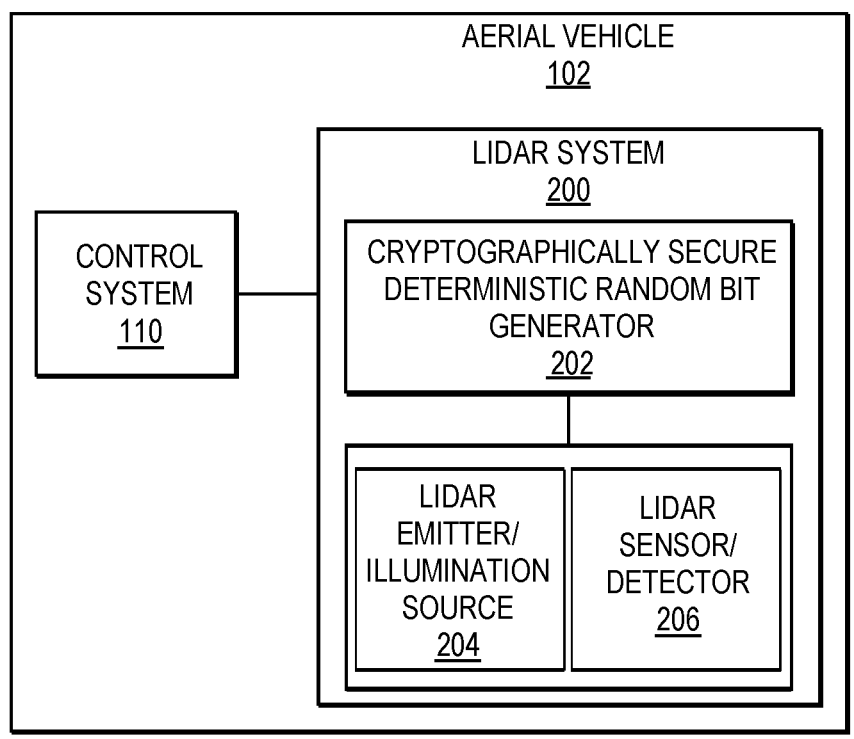
FIG. 2 is a block diagram illustration of an exemplary LIDAR system, in accordance with exemplary embodiments of the present disclosure.

FIG. 2 shows a block diagram of an exemplary LIDAR system 200, according to exemplary embodiments of the present disclosure. LIDAR system 200 may be configured to employ encrypted light pulses and, for example, LIDAR system 200 may be an exemplary LIDAR system that may be employed on an autonomous vehicle, such as aerial vehicle 102.

As shown in FIG. 2, LIDAR system 200 can be coupled to control system 110 of aerial vehicle 102 and can include cryptographically secure deterministic random bit generator 202, LIDAR emitter/illumination source 204, and LIDAR sensor/detector 206. According to certain aspects, LIDAR system 200 can be configured as any time-of-flight optical range-finding sensing system, such as an aerial LIDAR system, a mobile LIDAR system, a static LIDAR system, a terrestrial LIDAR system, a flash LIDAR system, etc. Further, control system 110 may control operation and/or navigation of the aerial vehicle 102, e.g., control operation of one or more control surfaces and/or one or more propulsion mechanisms based on data and information detected and/or provided by inertial measurement unit and/or one or more sensors, such as LIDAR system 200. Additionally, control system 110 my transmit and/or receive commands and/or instructions for the operation of LIDAR system 200 and various associated tasks, such as generation of a rendering of the environment (e.g., a three-dimensional point cloud, an elevational model, range-finding to surfaces, altitude measurements, other mesh model, etc.). In further exemplary embodiments, commands or instructions may be received and/or transmitted wirelessly from control components housed within LIDAR system 200 and/or control systems, such as control system 110. Additional operations and functions of control system 110 are described with reference to at least FIG. 6.

Cryptographically secure deterministic random bit generator 202 can include any type of cryptographically secure deterministic random bit generator that is configured to generate a pseudo-random output that appears to be truly random. For example, cryptographically secure deterministic random bit generator 202 can include a hardware-based bit generator, a computationally based bit generator, or any combination thereof. Accordingly, cryptographically secure deterministic random bit generator 202 can be used to generate cryptographically secure key sequences, which can be encoded in the light emitted by LIDAR system 200.

Further, LIDAR system 200 can include one or more LIDAR emitter/illumination source 204 and one or more LIDAR sensor/detector 206, which may be configured to implement any time-of-flight optical range-finding sensing system. For example, LIDAR emitter/illumination source 204 can include one or more sources generating ultraviolet, visible, infrared, etc. light, such as pulsed laser diodes (PLDs), optical phased arrays, infrared light emitting diodes (LEDs), and the like. Additionally, LIDAR sensor/detector 206 can include one or more sensors/detectors configured and tuned to detect the light produced by one or more LIDAR emitter/illumination source 204. For example, LIDAR sensor/detector 206 can include one or more photodiodes, one or more avalanche photodiodes, other photodetector arrays, etc. LIDAR emitter/illumination source 204 and one or more LIDAR sensor/detector 206 may be configured such that LIDAR system 200 can perform conventional scanning LIDAR (e.g., raster-type scanning of the environment, etc.), flash LIDAR (e.g., illumination of the entire field of view with a single pulse), or other type of time-of-flight type sensing to generate a rendering of the environment (e.g., a three-dimensional point cloud, an elevational model, range-finding to surfaces, altitude measurements, other mesh model, etc.).

In operation, LIDAR system 200 may receive a command or instruction from control system 110 to perform sensing of the environment (e.g., environment 100). Accordingly, cryptographically secure deterministic random bit generator 202 may first generate a secure pseudorandom key sequence. The secure pseudorandom key sequence may then be encoded in the light generated and emitted by one or more LIDAR emitter/illumination source 204. The encoded emitted light may propagate through the environment, until it encounters an object in the environment. The object, depending on certain characteristics and parameters associated with the object, may reflect at least a portion of the encoded emitted light. The reflected light may be detected and received by one or more LIDAR sensor/detector 206. The received reflected light can be authenticated to determine the encoding of any key sequence therein. If the received reflected light includes an encoded key sequence that matches the key sequence that was encoded into the emitted light, certain parameters associated with the received reflected light (e.g., time-of-flight, intensity, attenuation, etc.) can be used to determine a distance to the object in the environment. Alternatively, if the received reflected light does not include an encoded key sequence that matches the key sequence that was encoded into the emitted light, the received reflected light may be "discarded" such that the "discarded" light is not further processed or utilized. Further, certain statistical parameters associated with the amount of "discarded" light (e.g., ratio of authenticated reflected light compared to unauthentic reflected light, etc.) can be maintained and analyzed as real-time feedback indicating the amount of interfering and/or malicious light in the environment. Further, the character of the discarded light (e.g., certain parameters associated with the reflected light such as the nature of the encoded bit stream, any associated delay, etc.) may also provide an indication whether someone or something in the environment may be attempting to intentionally manipulate and/or interfere with the light being emitted and/or received by the exemplary LIDAR system.

Figure 3:
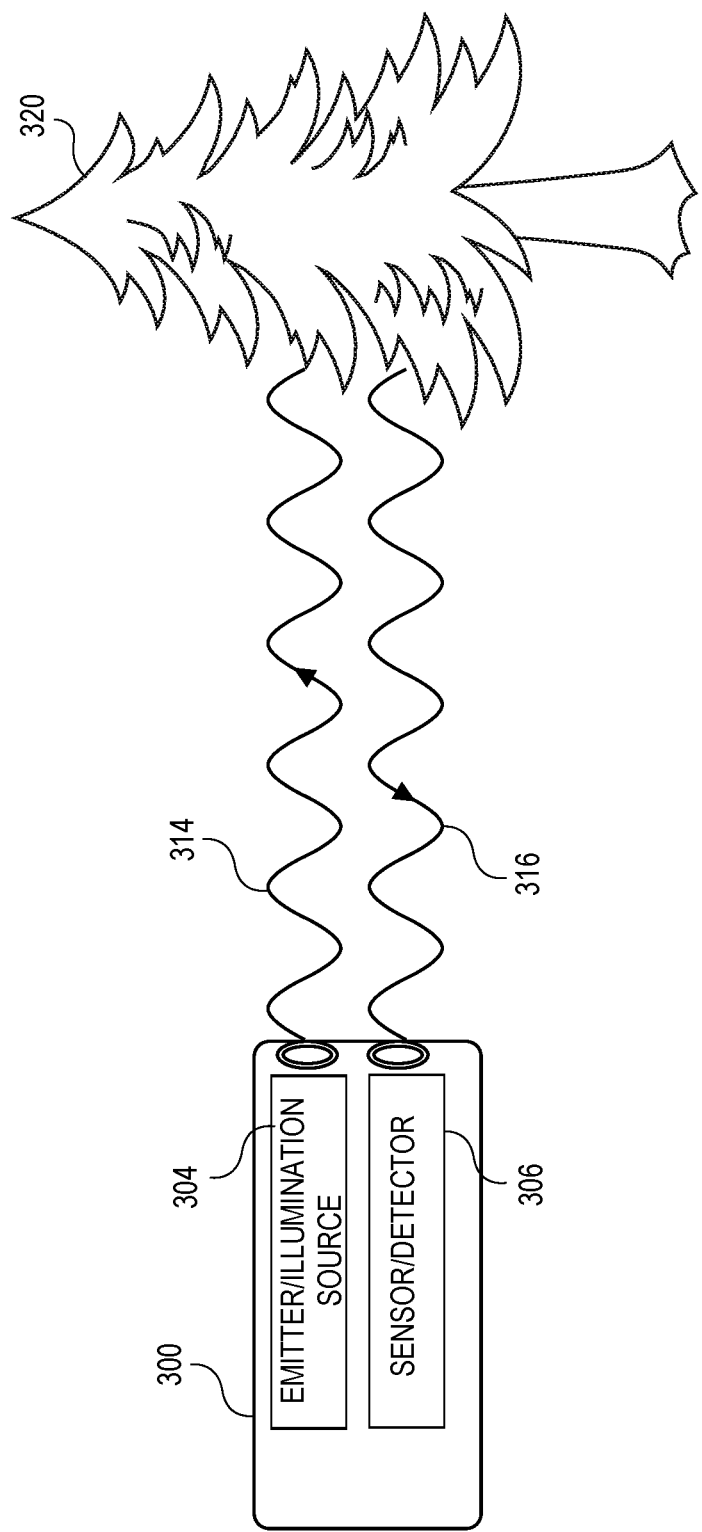
FIG. 3 is an illustration of an exemplary environment in which an exemplary LIDAR system may be used, in accordance with exemplary embodiments of the present disclosure.

FIG. 3 is an illustration of an exemplary operation of exemplary LIDAR system 300, according to exemplary embodiments of the present disclosure. LIDAR system 300 may be configured to employ encrypted light pulses and may be an exemplary LIDAR system that may be employed on an autonomous vehicle, such as aerial vehicle 102.

As shown in FIG. 3, LIDAR system 300 can include one or more LIDAR emitter/illumination source 304 and one or more LIDAR sensor/detector 306. LIDAR emitter/illumination source 304 can include one or more sources generating ultraviolet, visible, infrared, etc. light, such as pulsed laser diodes (PLDs), optical phased arrays, infrared light emitting diodes (LEDs), and the like. Additionally, LIDAR sensor/detector 306 can include one or more sensors/detectors configured and tuned to detect the light produced by one or more LIDAR emitter/illumination source 304. For example, LIDAR sensor/detector 306 can include one or more photodiodes, one or more avalanche photodiodes, other photodetector arrays, etc. LIDAR emitter/illumination source 304 and one or more LIDAR sensor/detector 306 may be configured such that LIDAR system 300 can perform conventional scanning LIDAR (e.g., raster-type scanning of the environment, etc.), flash LIDAR (e.g., illumination of the entire field of view with a single pulse), or other type of time-of-flight type sensing to generate a rendering of the environment (e.g., a three-dimensional point cloud, an elevational model, range-finding to surfaces, altitude measurements, other mesh model, etc.).

In operation, emitter/illumination source 304 may generate and emit light pulse 314. The encoded emitted light may propagate through the environment, until it encounters an object in the environment, such as tree 320. Accordingly, emitted light pulse 314 may be reflected by tree 320, and reflected light pulse 316 may be received by sensor/detector 306 of LIDAR system 300. LIDAR system 300 may determine certain characteristics and parameters associated with light pulse 316 (e.g., time-of-flight, intensity, attenuation, etc.) received by sensor/detector 306, and the characteristics and parameters can be used to determine, for example, a distance to each point of reflection from tree 320 so as to generate a rendering (e.g., a three dimensional point cloud, an elevational model, range-finding to surfaces, altitude measurements, other mesh model, etc.) of tree 320.

Figure 4A:
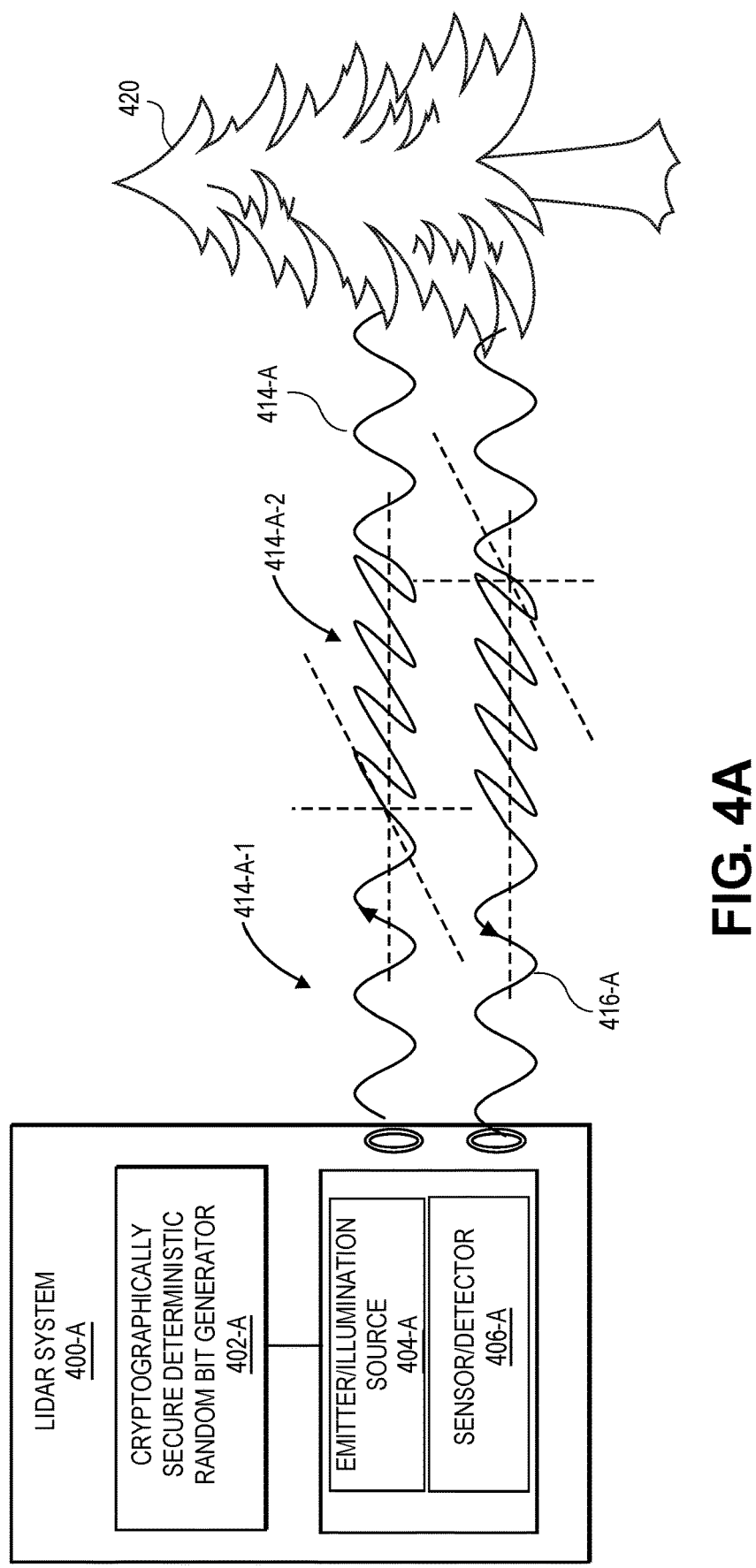
FIGS. 4A and 4B are illustrations of exemplary environments in which exemplary LIDAR systems may be used, in accordance with exemplary embodiments of the present disclosure.
Figure 4B:
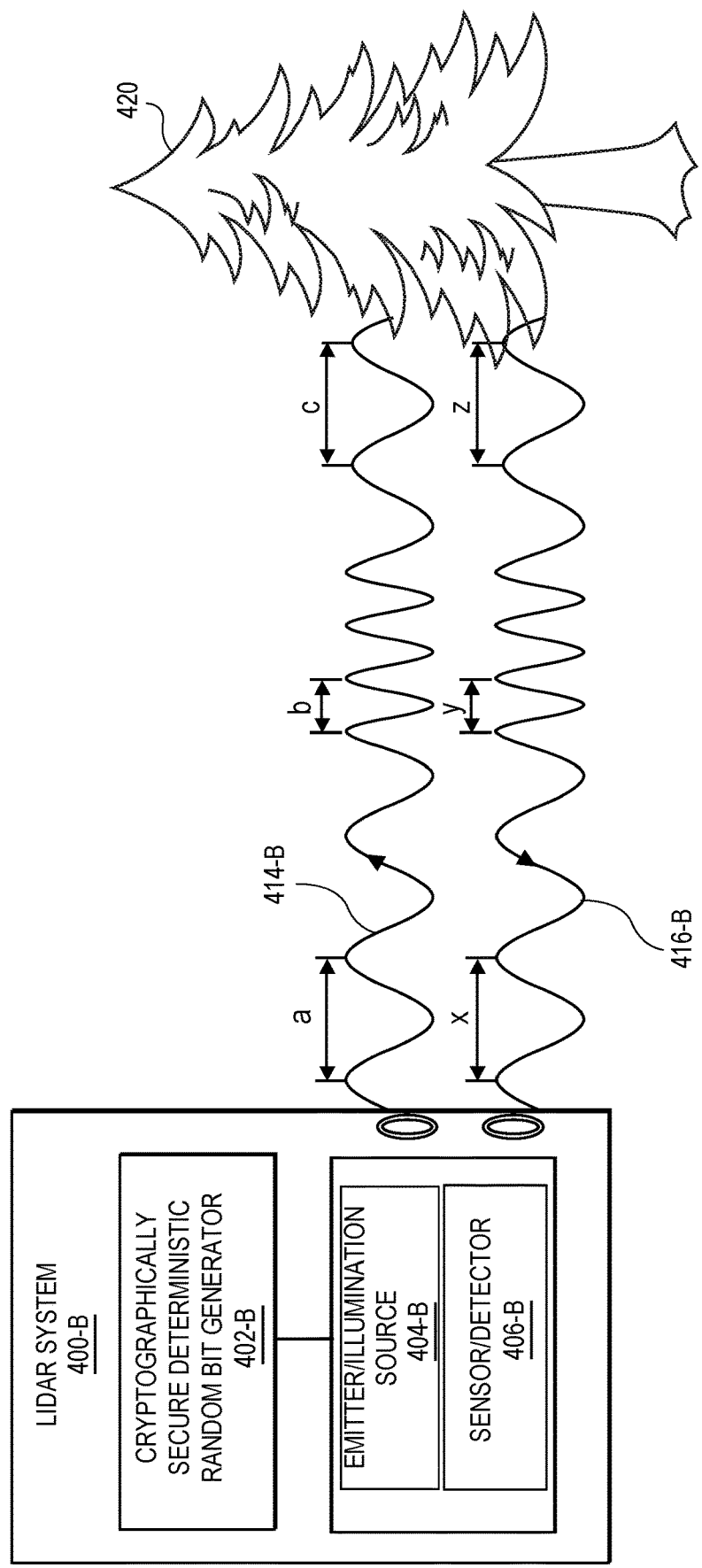

FIGS. 4A and 4B are illustrations of exemplary operations of exemplary LIDAR systems 400-A and 400-B, according to exemplary embodiments of the present disclosure. LIDAR systems 400-A and 400-B may be configured to employ encrypted light pulses and may be an exemplary LIDAR system that may be employed on an autonomous vehicle, such as aerial vehicle 102. In FIG. 4A, LIDAR system 400-A is shown encoding the cryptographically secure key sequence in the polarization of the emitted light pulse, whereas FIG. 4B shows the cryptographically secure key sequence encoded in the frequency of the emitted light pulse.

As shown in FIG. 4A, LIDAR system 400-A can include can include cryptographically secure deterministic random bit generator 402-A, LIDAR emitter/illumination source 404-A, and LIDAR sensor/detector 406-A. Similarly, FIG. 4B shows LIDAR system 400-B include including cryptographically secure deterministic random bit generator 402-B, LIDAR emitter/illumination source 404-B, and LIDAR sensor/detector 406-B. According to certain aspects, LIDAR systems 400-A and/or 400-B can be configured as any time-of-flight optical range-finding sensing system, such as an aerial LIDAR system, a mobile LIDAR system, a static LIDAR system, a terrestrial LIDAR, a flash LIDAR system, etc. Further, cryptographically secure deterministic random bit generator 402-A and/or 402-B can include any type of cryptographically secure deterministic random bit generator that is configured to generate a pseudo-random output that appears to be truly random. For example, cryptographically secure deterministic random bit generator 402-A and/or 402-B can include a hardware-based number generator, a computationally based number generator, or any combination thereof. Accordingly, cryptographically secure deterministic random bit generator 402-A and/or 402-B can be used to generate cryptographically secure key sequences, which can be encoded in the light emitted by emitter/illumination source 404-A and/or 404-B of LIDAR system 400-A and/or 400-B.

Further, LIDAR system 400-A and 400-B can include one or more LIDAR emitter/illumination source 404-A and 404-B, respectively, and one or more LIDAR sensor/detector 406-A and 406-B, respectively. LIDAR emitter/illumination source 404-A and 404-B and LIDAR sensor/detector 406-A and 406-B may be configured to implement any time-of-flight optical range-finding sensing system. For example, LIDAR emitter/illumination source 404-A and/or 404-B can include one or more sources generating ultraviolet, visible, infrared, etc. light, such as pulsed laser diodes (PLDs), optical phased arrays, infrared light emitting diodes (LEDs), and the like. Additionally, LIDAR sensor/detector 406-A and/or 406-B can include one or more sensors/detectors configured and tuned to detect the light produced by one or more LIDAR emitter/illumination source 404-A and/or 404-B. For example, LIDAR sensor/detector 406-A and/or 406-B can include one or more photodiodes, one or more avalanche photodiodes, other photodetector arrays, etc. Further, LIDAR emitter/illumination source 404-A and 404-B and one or more LIDAR sensor/detector 406-A and 406-B may be configured such that LIDAR system 400-A and 400-B can perform conventional scanning LIDAR (e.g., raster-type scanning of the environment, etc.), flash LIDAR (e.g., illumination of the entire field of view with a single pulse), or other type of time-of-flight type sensing to generate a rendering of the environment (e.g., a three-dimensional point cloud, an elevational model, range-finding to surfaces, altitude measurements, other mesh model, etc.).

In operation, cryptographically secure deterministic random bit generator 402-A and/or 402-B may first generate a secure pseudorandom key sequence. The secure pseudorandom key sequence may then be encoded in emitted light pulse 414-A and 414-B that may be generated and emitted by emitter/illumination source 404-A and 404-B, respectively. Encoded emitted light pulse 414-A and 414-B may propagate through the environment, until it encounters an object in the environment, such as tree 420.

As shown in FIG. 4A, the secure pseudorandom key sequence may be encoded in the polarization of emitted light pulse 414-A. For example, the secure pseudorandom key sequence may be encoded in the polarization states of emitted light pulse 414-A in one or more bases (e.g., rectilinear, diagonal, etc.). FIG. 4A shows several exemplary different polarization states 414-A-1 and 414-A-2 of emitted light pulse 414-A. Encoding the secure pseudorandom key sequence in the polarization of emitted light pulse 414-A is described further herein in connection with FIG. 4C.

Alternatively and/or in addition, in FIG. 4B, rather that encoding the secure pseudorandom key sequence in the polarization of the emitted light pulse, the secure pseudorandom key sequence is encoded in the frequency of emitted light pulse 414-B. As shown in FIG. 4B, emitted light pulse 414-B includes various exemplary frequency shifts (e.g., wavelength changes from a to b to c) for encoding the secure pseudorandom key sequence. Although encoding of the secure pseudorandom key sequence is primarily described with respect to the polarization and/or the frequency of the emitted light pulse, the secure pseudorandom key sequence may be encoded in any appropriate manner in the emitted light pulse.

Returning to the illustrations shown in FIGS. 4A and 4B, upon encountering tree 420, emitted light pulse 414-A and 414-B may be reflected by tree 420. Reflected light pulse 416-A and 416-B may include at least a portion of emitted light pulse 414-A and 414-B and reflected light pulse 416-A and 416-B may be received by sensor/detector 406-A and 406-B of LIDAR system 400-A and 400-B, respectively. LIDAR system 400-A and 400-B may authenticate the received reflected light pulses 416-A and 416-B to determine whether reflected light pulses 416-A and 416-B are encoded with a matching secure pseudorandom key sequence to the secure pseudorandom key sequence that was encoded in emitted light pulses 414-A and 414-B, respectively. For example, LIDAR system 400-A can process reflected light pulse 416-A to determine whether the secure pseudorandom key sequence that was encoded in the polarization states of emitted light pulse 414-A is consistent with any encoding in the polarization states of reflected light pulse 416-A. Similarly, LIDAR system 400-B can process reflected light pulse 416-B to determine whether the secure pseudorandom key sequence that was encoded in the frequency (e.g., wavelengths a, b, and c) of emitted light pulse 414-B is consistent with any encoding in the frequency (e.g., wavelengths x, y, and z) of reflected light pulse 416-B.

If the received reflected light pulses 416-A and 416-B are encoded with a key sequence that matches the key sequence that was encoded into emitted light pulses 414-A and 414-B, respectively, certain parameters associated with the emitted and received reflected light (e.g., time-of-flight, intensity, attenuation, etc.) can be used to determine a distance to each point of reflection from tree 420. The distance to each point of reflection can then be used to generate a rendering (e.g., a three-dimensional point cloud, an elevational model, range-finding to surfaces, altitude measurements, other mesh model, etc.) of tree 420, as well as other objects in the surrounding environment that may have reflected emitted light pulses 414-A and 414-B. Alternatively, if the received reflected light pulses 416-A and 416-B do not include an encoding that matches the key sequence that was encoded into emitted light pulses 414-A and 414-B, respectively, the received reflected light pulses 416-A and 416-B may be "discarded" such that the "discarded" light is not further processed or utilized (e.g., in the determination of distances, generation of a rendering, etc.). However, certain statistical parameters associated with the amount of "discarded" light (e.g., ratio of authenticated reflected light compared to unauthentic reflected light, etc.) can be maintained and analyzed as real-time feedback indicating the amount of interfering and/or malicious light in the environment. Further, the character of the discarded light (e.g., certain parameters associated with the reflected light such as the nature of the encoded bit stream, polarization states of the light, frequencies of the light, any associated delay, etc.) may also provide an indication whether someone or something in the environment may be attempting to intentionally manipulate and/or interfere with the light being emitted and/or received by the exemplary LIDAR system.

FIG. 4C is a table 450 illustrating an exemplary encoding protocol, according to exemplary embodiments of the present disclosure. The encoding protocol illustrated in table 450 may be one exemplary encoding protocol that may be employed by the LIDAR systems, such as LIDAR system 200, 300, and/or 400-A, to encode a cryptographically secure pseudorandom key sequence in an emitted pulse of light, such as emitted light pulse 130, 312, and/or 414-A, as described herein.

As shown in FIG. 4C, table 450 provides an exemplary encoding protocol for bit sequence 452. For example, the exemplary protocol defined in table 450 may be used to encode a cryptographically secure pseudorandom key sequence (e.g., that may be generated by cryptographically secure deterministic random bit generator 202, 402-A and/or 402-B) in the polarization states of emitted light (e.g., emitted light pulse 414-A). As shown in table 450, each bit in bit sequence is encoded using a polarization state 456 within a basis of polarization 454. Specifically, the exemplary encoding protocol shown in table 450 may include one or more bases of polarization 454 (e.g., rectilinear, diagonal, etc.), where each basis of polarization 454 may represent a pair of orthogonal polarization states. Although table 450 shows two bases of polarization 454, which are represented by a "+" corresponding to a first basis of polarization (e.g., rectilinear), and a "X" corresponding to a second basis of polarization (e.g., diagonal), aspects of the present disclosure contemplate employing an encoding protocol including any number of bases of polarization. Accordingly, each bit of bit sequence 452 is the encoded in a polarization state 456 within each basis of polarization 454.

In the exemplary implementation illustrated in FIG. 4C, "+" may be understood to represent a rectilinear basis and "X" may be understood to represent a diagonal basis. Assuming that the rectilinear basis includes polarization states of 0° and 90°, and the diagonal basis includes polarization states of 45° and 135°, the exemplary encoding protocol can provide four polarization states, and the arrows depicted in table 450 can represent the polarization of the light for encoding each bit in bit sequence 452. For example, as shown in FIG. 4C, bit 452-1 (having a value of "0") may be encoded in the rectilinear basis (+) in the 90° polarization state. Accordingly, bit 452-2 (having a value of "0") may be encoded in the diagonal basis (X) in the 45° polarization state, bit 452-3 (having a value of "1") may be encoded in the diagonal basis (X) in the 135° polarization state, bit 452-4 (having a value of "0") may be encoded in the rectilinear basis (+) in the 90° polarization state, bit 452-5 (having a value of "1") may be encoded in the rectilinear basis (+) in the 0° polarization state, bit 452-6 (having a value of "1") may be encoded in the rectilinear basis (+) in the ( ) polarization state, and bit 452-7 (having a value of "1") may be encoded in the diagonal basis (X) in the 135° polarization state. Alternatively and/or in addition, any number of bases of polarization and polarization state may be employed. For example, other implementations may include one basis of orthogonal polarization states (e.g., rectilinear with polarization states of 0° and 90°), one basis of non-orthogonal polarization states (e.g., polarization states of 0° and 45°), etc.

Figure 5:
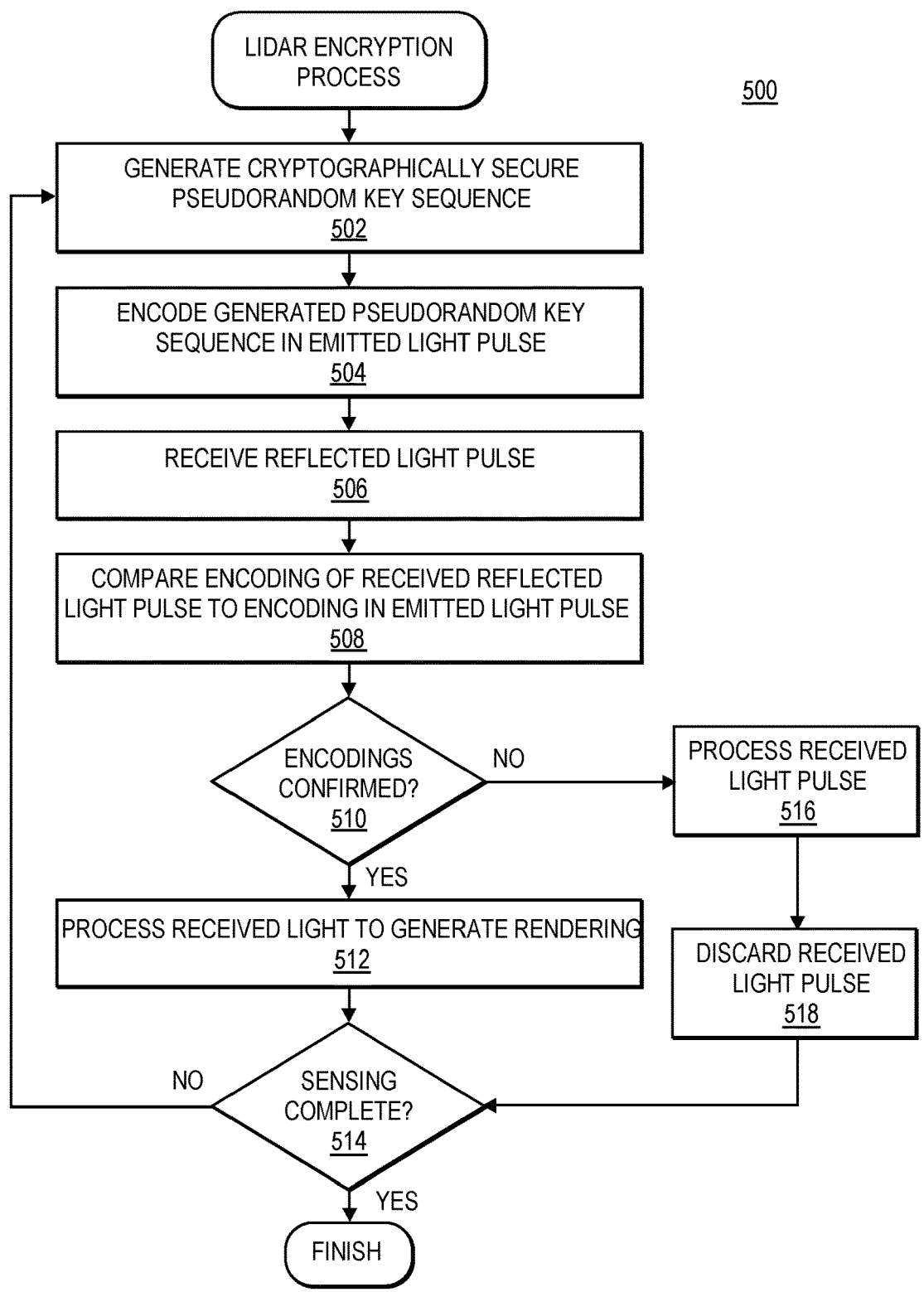
FIG. 5 is a flow diagram of an exemplary LIDAR encryption process, in accordance with exemplary embodiments of the present disclosure.

FIG. 5 is a flow diagram of an exemplary LIDAR encryption process, according to exemplary embodiments of the present disclosure. For example, process 500 may be performed by any of LIDAR systems 200, 300, 400-A, and/or 400-B, which may be employed on an autonomous vehicle, such as aerial vehicle 102.

As shown in FIG. 5, a cryptographically secure pseudorandom key sequence may be generated, as in step 502. For example, the cryptographically secure pseudorandom key sequence may be generated by any cryptographically secure deterministic random bit generator (e.g., such as cryptographically secure deterministic random bit generator 202, 402-A, and/or 402-B). In step 504, the cryptographically secure pseudorandom key sequence may be encoded in an emitted light pulse. For example, the secure pseudorandom key sequence may be encoded in light pulses generated and emitted by an emitter/illumination source (e.g., such as emitter/illumination source 404-A and/or 404-B) of a LIDAR system (e.g., LIDAR system 200, 300, 400-A, and/or 400-B). As described herein, the secure pseudorandom key sequence may be encoded, for example, in the polarization states and/or frequency of the emitted light pulse.

Next, after the encoded emitted light pulse propagates through the environment, upon encountering an object in the environment, the emitted light pulse may be at least partially reflected by the object. The light reflected by the object may then be received by the LIDAR system, as in step 506. The received reflected light may then be authenticated to determine whether the received reflected light is encoded with a matching secure pseudorandom key sequence to the secure pseudorandom key sequence that was encoded in the emitted light pulse (step 508). If it is confirmed that the received reflected light is encoded with a key sequence that matches the key sequence that was encoded into emitted light pulse (step 510), certain parameters associated with the emitted and received reflected light (e.g., time-of-flight, intensity, attenuation, etc.) can be processed and used to determine a distance to each point of reflection from the object. For example, the distance to each point of reflection can then be used to generate a rendering (e.g., a three-dimensional point cloud, an elevational model, range-finding to surfaces, altitude measurements, other mesh model, etc.) of the object, as in step 512.

Alternatively, if the received reflected light does not include an encoding that matches the key sequence that was encoded into the emitted light pulse, optionally, the instances of light received not encoded with a key sequence that matches the key sequence that was encoded into the emitted light pulse can be stored and processed as an indication of the optical conditions in the environment (e.g., as ratio of authenticated reflected light compared to unauthentic reflected light, etc. to provide an indication of the amount of interfering and/or malicious light), as in step 516. Further, the character of the discarded light (e.g., certain parameters associated with the reflected light such as the nature of the encoded bit stream, polarization states of the light, frequencies of the light, any associated delay, etc.) may also provide an indication whether someone or something in the environment may be attempting to intentionally manipulate and/or interfere with the light being emitted and/or received by the exemplary LIDAR system. Additionally, the unauthenticated light will then be "discarded," such that it is not utilized in the determination of distances to objects in the environment (step 518).

In step 514, it is determined whether sensing of the environment is complete. If sensing is not complete, a cryptographically secure pseudorandom key sequence may again be generated, which may be encoded into subsequently generated and emitted light pulses. Alternatively and/or in addition, each cryptographically secure pseudorandom key sequence may include an associated period of validity (e.g., a specified time period, a single mission for the automated vehicle, etc.) and a new cryptographically secure pseudorandom key sequence may only be generated after expiration of the previously generated cryptographically secure pseudorandom key sequence.

Figure 6:
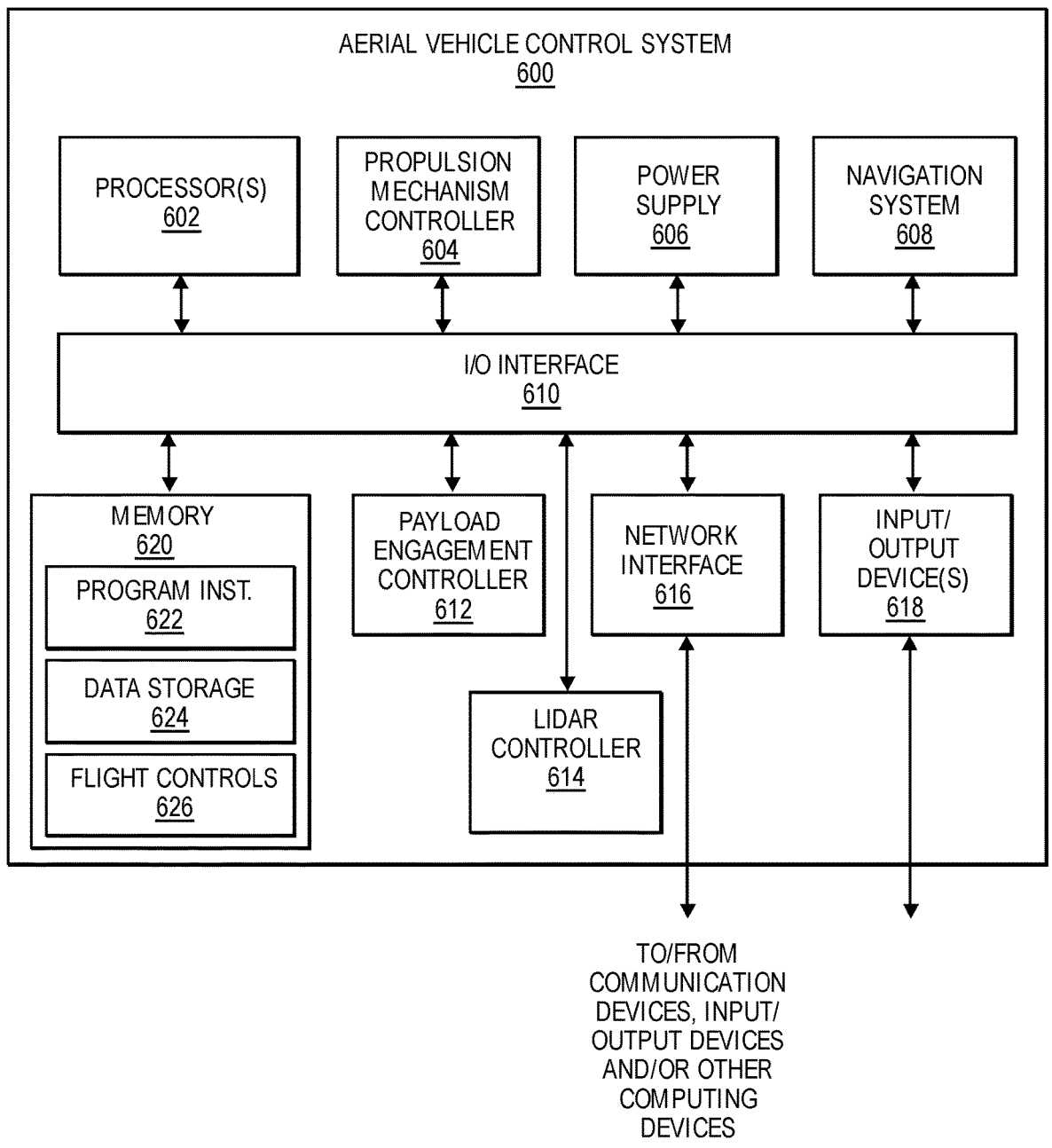
FIG. 6 is a block diagram illustration of an exemplary aerial vehicle control system, in accordance with exemplary embodiments of the present disclosure.

FIG. 6 is a block diagram illustrating various components of an exemplary aerial vehicle control system 600, according to embodiments of the present disclosure.

In various examples, the block diagram may be illustrative of one or more aspects of the aerial vehicle control system 600 that may be used to implement the various systems and methods discussed herein and/or to control operation of an aerial vehicle discussed herein. In the illustrated implementation, the aerial vehicle control system 600 includes one or more processors 602, coupled to a memory, e.g., a non-transitory computer readable storage medium 620, via an input/output (I/O) interface 610. The aerial vehicle control system 600 also includes propulsion mechanism controllers 604, such as electronic speed controls (ESCs) or motor controllers, power modules 606 and/or a navigation system 608. The aerial vehicle control system 600 further includes a payload engagement controller 612, a LIDAR controller 614 configured to control operation of a LIDAR system, as described herein, a network interface 616, and one or more input/output devices 618.

In various implementations, the aerial vehicle control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, navigation and flight control data, environment data, vehicle data, and/or other data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624 and flight controls 626, respectively. In other implementations, program instructions, data, and/or flight controls may be received, sent, or stored upon different types of computer-accessible media, such as non-transitory media, or on similar media separate from the non-transitory computer readable storage medium 620 or the aerial vehicle control system 600. Generally speaking, a non-transitory, computer readable storage medium may include storage media or memory media such as magnetic or optical media, e.g., disk or CD/DVD-ROM, coupled to the aerial vehicle control system 600 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propulsion mechanism controllers 604 may communicate with the navigation system 608 and adjust the rotational speed, position, orientation, or other parameters of each propulsion mechanism to control and/or stabilize the aerial vehicle, and/or to perform one or more maneuvers and guide the aerial vehicle along a flight path, as described herein.

The navigation system 608 may include a global positioning system (GPS), indoor positioning system (IPS), or other similar system and/or sensors that can be used to navigate the aerial vehicle to and/or from a location. The payload engagement controller 612 communicates with the actuator(s) or motor(s) (e.g., a servo motor) used to engage and/or disengage items.

LIDAR controller 614 may be configured to send and receive instructions in connection with the operation of the exemplary LIDAR system. Accordingly, LIDAR controller 614 may comprise and/or communicate with the various components of the exemplary LIDAR systems (e.g., the cryptographically secure deterministic random bit generator, the emitter/illumination source, the sensor/detector, etc.). In some exemplary embodiments, LIDAR controller 614 may be integrated with or form a part of one or more of the processors 602, memory 620, and/or the navigation system 608, or various other systems and/or components.

The network interface 616 may be configured to allow data to be exchanged between the aerial vehicle control system 600, other devices attached to a network, such as other computer systems (e.g., remote computing resources), and/or with aerial vehicle control systems of other aerial vehicles. For example, the network interface 616 may enable wireless communication between the aerial vehicle and an aerial vehicle control system that is implemented on one or more remote computing resources. For wireless communication, an antenna of the aerial vehicle or other communication components may be utilized. As another example, the network interface 616 may enable wireless communication between numerous aerial vehicles. In various implementations, the network interface 616 may support communication via wireless general data networks, such as a Wi-Fi network. For example, the network interface 616 may support communication via telecommunications networks, such as cellular communication networks, satellite networks, and the like.

Input/output devices 618 may, in some implementations, include one or more displays, imaging devices, thermal sensors, infrared sensors, time of flight sensors, inertial measurement units, accelerometers, gyroscopes, wind sensors, pressure sensors, weather sensors, etc. Multiple input/output devices 618 may be present and controlled by the aerial vehicle control system 600.

As shown in FIG. 6, the memory may include program instructions 622, which may be configured to implement the example routines and/or sub-routines described herein. The data storage 624 may include various data stores for maintaining data items that may be provided for controlling aerial vehicles, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 600 is merely illustrative and is not intended to limit the scope of the present disclosure. In particular, the computing system and devices may include any combination of hardware or software that can perform the indicated functions. The aerial vehicle control system 600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 600. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 600 may be transmitted to the aerial vehicle control system 600 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

Although the invention has been described and illustrated with respect to illustrative implementations thereof, the foregoing and various other additions and omissions may be made therein and thereto without departing from the spirit and scope of the present disclosure.

What is claimed is:

1. A vehicle, comprising:
    a LIDAR system including:
        a cryptographically secure deterministic random bit generator (DRBG) configured to generate a first cryptographically secure pseudorandom key sequence;
        an illumination source configured to emit at least one light pulse encoded with the first cryptographically secure pseudorandom key sequence; and
        a detector configured to receive at least one reflected light pulse, the at least one reflected light pulse including at least a portion of the at least one light pulse that was reflected by an object external to the vehicle; and
    a control system including one or more processors and a memory coupled to the one or more processors and storing program instructions that, when executed by the one or more processors, cause the one or more processors to at least:
        determine that the at least one reflected light pulse is encoded with a second cryptographically secure pseudorandom key sequence to authenticate the at least one reflected light pulse;
        compare the first cryptographically secure pseudorandom key sequence against the second cryptographically secure pseudorandom key sequence to determine that the second cryptographically secure pseudorandom key sequence matches the first cryptographically secure pseudorandom key sequence;
        determine a distance to the object based at least in part on a time-of-flight associated with the at least one light pulse and the at least one reflected light pulse;
        generate a rendering of the object based at least in part on the distance to the object;
        determine that a second reflected light pulse of the at least one reflected light pulse is not encoded with a third cryptographically secure pseudorandom key sequence that matches the first cryptographically secure pseudorandom key sequence;
        discard the second reflected light pulse, such that the second reflected light pulse is not used in the determination of the distance to the object or generation of the rendering of the object; and
        determine a ratio of authenticated reflected light to discarded reflected light as an indication of optical conditions in an environment in which the vehicle is operating.

2. The vehicle of claim 1, wherein the first cryptographically secure pseudorandom key sequence is encoded in at least one of a polarization or a frequency associated with the at least one light pulse.

3. The vehicle of claim 1, wherein the rendering includes at least one of a three-dimensional point cloud, a range finding value, an altitude measurement, or an elevational model.

4. The vehicle of claim 1, wherein the vehicle is an unmanned aerial vehicle.

5. A LIDAR system, comprising:
    an illumination source configured to emit a light pulse encoded with a first cryptographically secure pseudorandom key sequence;
    a detector configured to receive a first reflected light pulse reflected by an object; and
    a control system including one or more processors and a memory coupled to the one or more processors and storing program instructions that, when executed by the one or more processors, cause the one or more processors to at least:
        determine that the first reflected light pulse is encoded with a second cryptographically secure pseudorandom key sequence that matches the first cryptographically secure pseudorandom key sequence to authenticate the first reflected light pulse;
        generate a rendering of the object based at least in part on a first parameter associated with the light pulse and the first reflected light pulse;
        determine that a second reflected light pulse is not encoded with a third cryptographically secure pseudorandom key sequence that matches the first cryptographically secure pseudorandom key sequence;
        discard the second reflected light pulse, such that the second reflected light pulse is not used in the generation of the rendering of the object; and
        determine a ratio of authenticated reflected light to discarded reflected light as an indication of optical conditions in an environment in which the LIDAR system is operating.

6. The LIDAR system of claim 5, wherein the first cryptographically secure pseudorandom key sequence is encoded in at least one of a polarization or a frequency associated with the light pulse.

7. The LIDAR system of claim 5, wherein the first cryptographically secure pseudorandom key sequence is encoded in a polarization associated with the light pulse using more than one basis of polarization.

8. The LIDAR system of claim 5, wherein the first cryptographically secure pseudorandom key sequence is encoded in a polarization associated with the light pulse using non-orthogonal polarization states.

9. The LIDAR system of claim 5, wherein the illumination source and the detector are configured to perform flash LIDAR.

10. The LIDAR system of claim 5, wherein the first parameter associated with the light pulse and the first reflected light pulse includes at least one of a time-of-flight, an intensity, or an attenuation.

11. The LIDAR system of claim 5, wherein the rendering includes at least one of a three-dimensional point cloud, a range finding value, an altitude measurement, or an elevational model.

12. A method, comprising:
generating a first cryptographically secure pseudorandom key sequence;
encoding the first cryptographically secure pseudorandom key sequence in a light pulse;
emitting the light pulse encoded with the first cryptographically secure pseudorandom key sequence;
receiving a first reflected light pulse, the first reflected light pulse including at least a portion of the light pulse that was reflected by an object;
determining that the first reflected light pulse is encoded with a second cryptographically secure pseudorandom key sequence that matches the first cryptographically secure pseudorandom key sequence;
determining a distance to the object based at least in part on a parameter associated with the light pulse and the first reflected light pulse;
generating a rendering of the object based at least in part on the distance to the object;
receiving a second reflected light pulse;
determining that the second reflected light pulse is not encoded with a third cryptographically secure pseudorandom key sequence that matches the first cryptographically secure pseudorandom key sequence;
discarding the second reflected light pulse, such that the second reflected light pulse is not used in the determining of the distance to the object or the generating of the rendering of the object; and
determining a ratio of authenticated reflected light to discarded reflected light as an indication of conditions.

13. The method of claim 12, wherein the first cryptographically secure pseudorandom key sequence is encoded in at least one of a polarization or a frequency associated with the light pulse.

14. The method of claim 12, wherein the parameter associated with the light pulse and the first reflected light pulse includes at least one of a time-of-flight, an intensity, or an attenuation.

15. The method of claim 12, wherein the method is performed during aerial navigation of an unmanned aerial vehicle.

* * * * *